(12) United States Patent
Steck et al.

(10) Patent No.: US 11,034,380 B2
(45) Date of Patent: Jun. 15, 2021

(54) RACK-AND-PINION STEERING SYSTEM FOR A MOTOR VEHICLE HAVING A WORM GEAR SET

(71) Applicants: THYSSENKRUPP PRESTA AG, Eschen (LI); thyssenkrupp AG, Essen (DE)

(72) Inventors: Philippe Steck, Gamprin-Bendern (LI); Patrick Baumgartner, St. Gallen (CH)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 237 days.

(21) Appl. No.: 16/344,451

(22) PCT Filed: Nov. 8, 2017

(86) PCT No.: PCT/EP2017/078543
§ 371 (c)(1),
(2) Date: Apr. 24, 2019

(87) PCT Pub. No.: WO2018/087117
PCT Pub. Date: May 17, 2018

(65) Prior Publication Data
US 2019/0322310 A1 Oct. 24, 2019

(30) Foreign Application Priority Data
Nov. 9, 2016 (DE) .................. 10 2016 013 269.8

(51) Int. Cl.
*B62D 5/04* (2006.01)
*B62D 3/12* (2006.01)

(52) U.S. Cl.
CPC .............. *B62D 5/0421* (2013.01); *B62D 3/12* (2013.01); *B62D 5/0403* (2013.01); *B62D 5/0454* (2013.01)

(58) Field of Classification Search
None
See application file for complete search history.

(56) References Cited

U.S. PATENT DOCUMENTS 9,527,524 B2 * 12/2016 Sato .................. B62D 5/0421
2012/0233860 A1 9/2012 Yoneda
(Continued)

FOREIGN PATENT DOCUMENTS

| CN | 103318249 A | 9/2013 |
|---|---|---|
| DE | 23 365 72 A | 1/1974 |

(Continued)

OTHER PUBLICATIONS

English Translation of International Search Report issued in PCT/EP2017/078543, dated Nov. 8, 2017.

*Primary Examiner* — Kevin Hurley
(74) *Attorney, Agent, or Firm* — thyssenkrupp North America, LLC

(57) ABSTRACT

A rack and pinion steering system for a motor vehicle may include a pinion shaft that is connected to a steering shaft and has a steering pinion that is engaged with a rack mounted in a steering gear housing such that the rack can be displaced along a longitudinal axis for pivoting steerable wheels. The steering shaft, the pinion shaft with the steering pinion, and the step-down gear mechanism may be received in the steering gear housing. The rack and pinion steering system may further include an electric motor that drives the pinion shaft via a step-down gear mechanism. The step-down gear mechanism may be arranged at an end of the pinion shaft that is remote from the steering shaft.

7 Claims, 2 Drawing Sheets

(56) References Cited

U.S. PATENT DOCUMENTS

| | | |
|---|---|---|
| 2013/0180794 A1 | 7/2013 | Shiino |
| 2013/0248278 A1 | 9/2013 | Ishii |
| 2015/0266506 A1 | 9/2015 | Sato |
| 2016/0137219 A1 | 5/2016 | Schröder |
| 2016/0207565 A1 | 7/2016 | Maier |

FOREIGN PATENT DOCUMENTS

| | | | | |
|---|---|---|---|---|
| DE | 10 2011 001 217 A | 9/2012 | | |
| DE | 102015213304 A | 11/2016 | | |
| EP | 2 703 252 A | 3/2014 | | |
| FR | 2908724 A1 * | 5/2008 | ........... | B62D 5/0421 |
| JP | 2009-120094 A | 6/2009 | | |
| JP | 2014-169079 A | 9/2014 | | |
| JP | 2015-178295 A | 10/2015 | | |

\* cited by examiner

RACK-AND-PINION STEERING SYSTEM FOR A MOTOR VEHICLE HAVING A WORM GEAR SET

CROSS REFERENCE TO RELATED APPLICATIONS

This application is a U.S. National Stage Entry of International Patent Application Serial Number PCT/EP2017/078543, filed Nov. 8, 2017, which claims priority to German Patent Application No. DE102016013269.8, filed Nov. 9, 2016, the entire contents of both of which are incorporated herein by reference.

FIELD

The present disclosure generally relates to steering systems, including rack and pinion steering systems for motor vehicles.

BACKGROUND

Rack and pinion steering systems of the generic type have a rack which is guided in a linearly movable manner in a steering gear housing, and a rotatably mounted steering pinion which is in engagement with the rack. The steering torque which is exerted on a steering wheel by a driver is transmitted via a steering shaft to an input shaft of the steering gear. The input shaft of the steering gear is connected to a steering pinion which meshes with the rack. A rotation of the input shaft and the steering pinion is converted via the tooth engagement of the rack into a linear movement of the rack. Track rods are articulated on the rack, with the aid of which track rods the steered wheels are adjusted by a wheel lock angle. The rotation of the steering wheel is thus converted into a steering movement of the steered wheels. In the case of electrically assisted rack and pinion steering systems, a servomotor is provided which acts, for example, by means of a mechanical step-down gear mechanism with a worm and a worm gear on the steering pinion and thus assists the driver during a steering maneuver. Here, the servomotor is arranged between the input shaft and the steering pinion. This arrangement can prove disadvantageous, however, since it requires a large quantity of installation space.

Thus a need exists for a rack and pinion steering system for a motor vehicle having a compact steering gear which requires a small amount of installation space.

DETAILED DESCRIPTION

Figure 1:
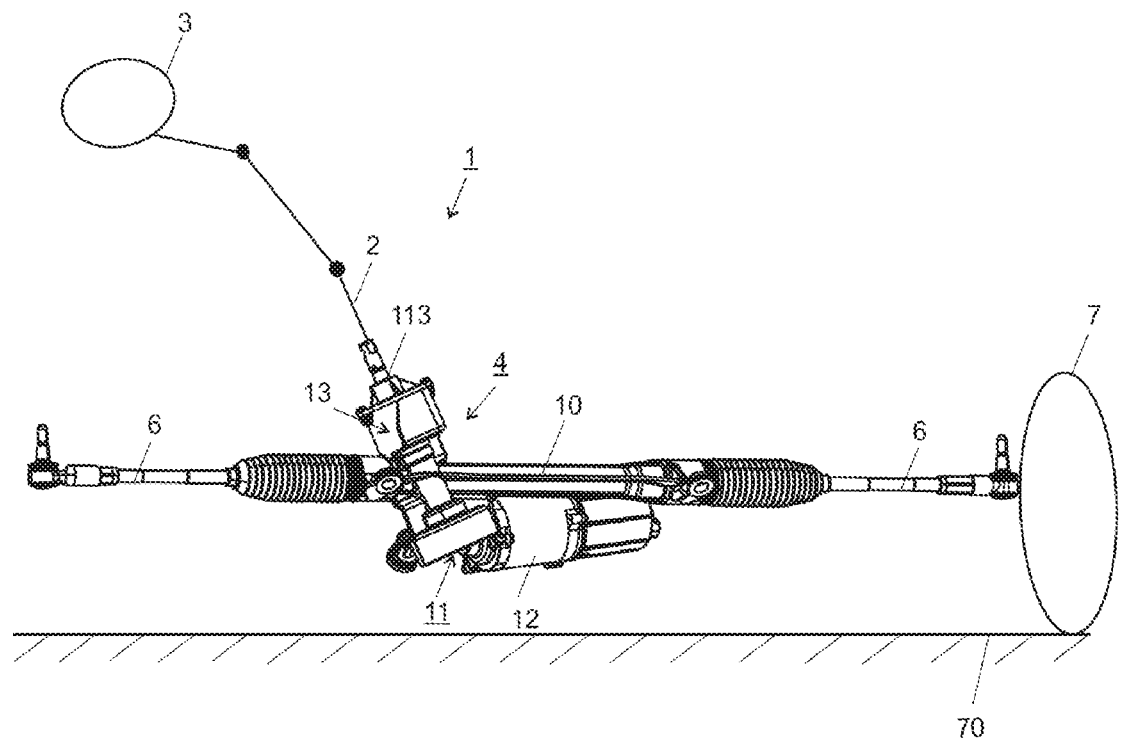
FIG. 1 is a diagrammatic view of an example rack and pinion steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a rack and pinion steering system for a motor vehicle is provided, comprising a pinion shaft which is connected to a steering shaft and has a steering pinion which is in engagement with a rack which is mounted in a housing such that it can be displaced along a longitudinal axis for pivoting steerable wheels, and having an electric motor which drives the pinion shaft via a step-down gear mechanism, the steering shaft, the pinion shaft with the steering pinion, and the step-down gear mechanism forming an overall arrangement which is received in a steering gear housing, the step-down gear mechanism being arranged at that end of the pinion shaft which is remote from the steering shaft. The arrangement of the step-down gear mechanism on that side of the pinion shaft which is remote from the steering shaft is particularly favorable, since a small amount of installation space is required as a result. The step-down gear mechanism is preferably arranged on the pinion shaft below the steering pinion and therefore on the opposite side with respect to the input shaft. It is preferred here if the electric motor is likewise arranged on the underside of the steering gear. Here, the underside is to be understood to mean the side of the steering gear in the direction of the roadway. The step-down gear mechanism and the electric motor therefore lie below the rack and on the side of the roadway, which is particularly space-saving.

Furthermore, it is preferred if, at its end which is close to the steering shaft, the steering pinion is connected to a torsion bar which connects the pinion shaft to an input shaft, the torsion bar being part of a torque sensor which determines the steering torque which is applied at the steering wheel and is required for actuating the electric motor, and the step-down gear mechanism and the electric motor being arranged on the opposite side of the rack with respect to the torque sensor. The steering gear can be of even more compact configuration as a result of the spatial separation of the torque sensor and the drive.

In one preferred embodiment, the step-down gear mechanism is a worm gear mechanism, a worm gear of the worm gear mechanism surrounding the pinion shaft concentrically and being connected fixedly to the latter so as to rotate with it.

The pinion shaft is preferably mounted rotatably in a bearing in the steering gear housing between the steering pinion and the end which is remote from the steering shaft.

It can be provided, furthermore, that the pinion shaft is mounted rotatably in a bearing in the steering gear housing between the steering pinion and the worm gear.

The electric motor is preferably an electric servomotor which drives a worm shaft of the worm gear mechanism.

For simplified assembly of the steering gear, it can be provided that the pinion shaft has a tapered portion between the steering pinion and the bearing, the diameter of which"

tapered portion is smaller than that of the steering pinion and a bearing seat of the bearing. The rack can therefore be inserted into the housing past the pinion in the region of the tapered portion. In this case, the tapered portion preferably adjoins the steering pinion directly on the pinion shaft.

FIG. 1 diagrammatically shows a rack and pinion steering system 1 of a motor vehicle. A steering shaft 2 serves for the transmission of the steering movements which are carried out at the steering wheel 3 by a driver of the motor vehicle to a rack and pinion steering gear 4. The rack and pinion steering gear 4 converts the rotational movement of the steering shaft 2 into a movement of a rack 5, as a result of which the wheel 7 of the vehicle, which wheel 7 is articulated on a track rod 6, carries out a steering lock movement. The rotational movement of the steering shaft 2 is converted into a translational movement of the rack 5 via a steering pinion 8 which meshes with the rack 5 in a toothing region 9. The rack 5 is mounted in an axially movable manner in a steering gear housing 10. A step-down gear mechanism 11 and an electric servomotor 12 are arranged on a side of the rack 5, which side is remote from the steering shaft. The servomotor 12 acts via the step-down gear mechanism 11 on the steering pinion 8 for steering assistance.

Figure 2:
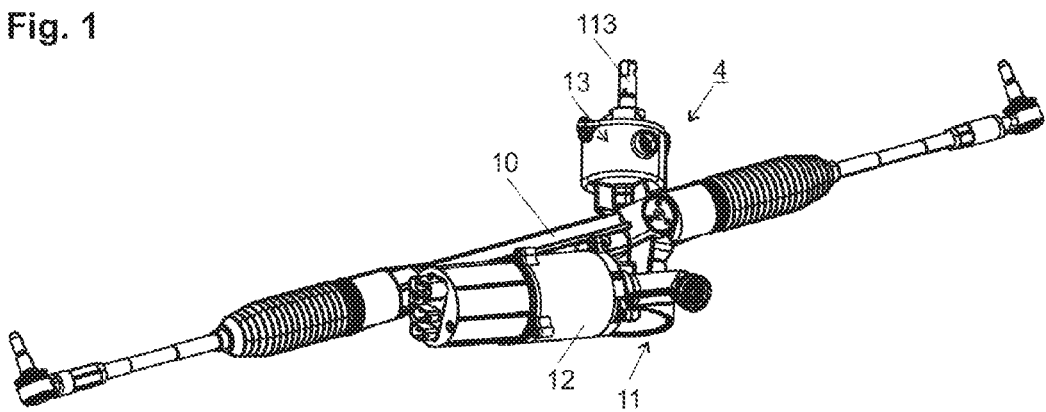
FIG. 2 is a perspective view of the steering gear from FIG. 1.

FIG. 2 shows a second view of the position of the step-down gear mechanism 11 and the servomotor 12 below the rack 5.

Figure 4:
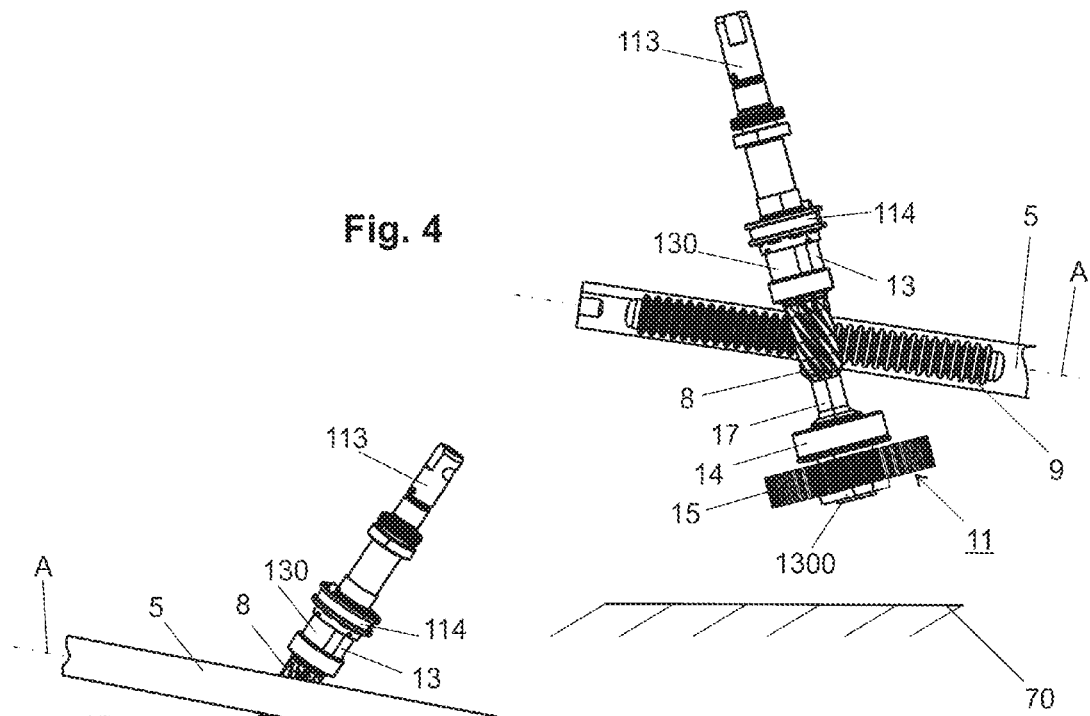
FIG. 4 is a side view illustrating engagement between an example steering pinion and an example rack with a worm gear mechanism.
Figure 3:
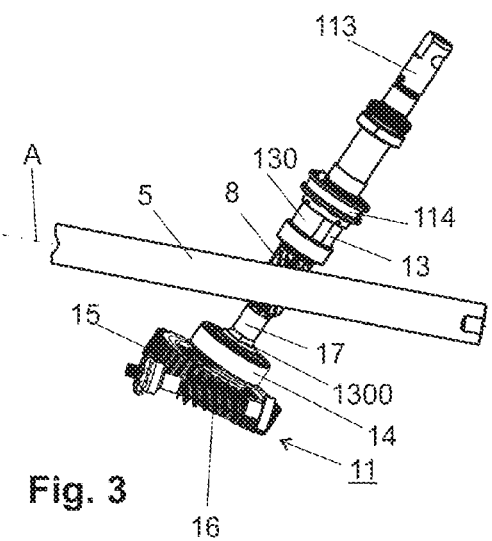
FIG. 3 is a detail perspective view of an example worm gear mechanism of a steering assistance means with a rack and a steering pinion.
Figure 5:
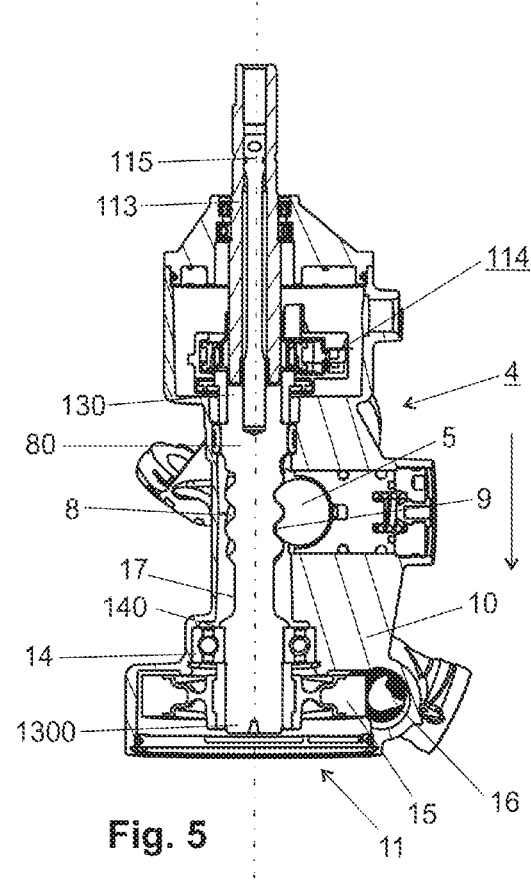
FIG. 5 is a longitudinal sectional view of an example rack and pinion steering system.

FIGS. 3 and 4 show two different views of the engagement of the steering pinion 8 into the toothing region 9 of the rack 5. The steering pinion 8 is arranged on a pinion shaft 13 which has an end 130 which is close to the steering shaft and an end 1300 which is remote from the steering shaft. As shown in FIG. 5, the end 130' which is close to the steering shaft is connected to a torsion bar 115 which connects the pinion shaft 13 to an input shaft 113 which is in turn connected fixedly to the steering wheel 3 so as to rotate with it via the steering shaft 2. The torsion bar 115 brings about a relative rotation between the input shaft 113 and the pinion shaft 13 in a manner which is dependent on the steering wheel torque. The torsion bar 115 is part of a torque sensor 114 which determines the steering torque which is applied at the steering wheel 3 and is required for actuating the electric motor 12. The pinion shaft 13 is mounted rotatably in a bearing 14 in the steering gear housing 10 between the steering pinion 8 and the end 1300 which is remote from the steering shaft. A worm gear 15 of the step-down gear mechanism 11 is provided at that end 1300 of the pinion shaft 13 which is remote from the steering shaft, which worm gear 15 surrounds the pinion shaft 13 concentrically and is connected fixedly to the latter so as to rotate with it. The electric servomotor (not shown here) drives a worm shaft 16 which meshes with the worm gear 15 which is arranged on the pinion shaft 13. Since the worm gear mechanism 11 is arranged at that end 1300 of the pinion shaft 13 which is remote from the steering shaft and is therefore arranged so as to lie below the pinion 8, the servomotor 12 can likewise be attached on the underside of the steering gear and, to be precise, closer to the roadway 70, in comparison with the rack 5, which is particularly space-saving.

The pinion shaft 13 has a tapered portion 17 between the steering pinion 8 and the bearing 14 or between the steering pinion 8 and the worm gear 16, the diameter of which tapered portion 17 is smaller than that of the steering pinion 8 and a bearing seat 140 of the bearing 14. The tapered portion 17 preferably adjoins the steering pinion 8 directly. During the assembly, the input shaft 2 is pushed with the torsion bar 115 and the steering pinion 8 into a housing opening of the steering gear housing 10, which housing opening is provided for this purpose, to be precise to such an extent that the region of the tapered portion 17 of the pinion shaft 13 is situated at the level of the rack 5 which is to be inserted. In a second step, the rack 5 is pushed into the housing opening which is provided correspondingly for this purpose. The rack 5 can be pushed past the tapered portion 17 of the pinion shaft 13 as far as into an end position. The pinion shaft 13 is subsequently pressed downward further into the steering gear housing 10, in the direction of the roadway 70, as far as an end position, with the result that the toothing region 9 of the rack 5 comes into engagement with the toothing system 8 of the steering pinion. The rack and pinion mechanism can thus be assembled in the steering gear housing in a particularly simple manner.

The steering gear housing is preferably configured in one piece with the drive gear housing, in which the step-down gear mechanism 12 is received, and is produced from aluminum or magnesium or plastic. The single-piece design has the advantage that the sealing point of the drive gear housing to the steering gear housing is dispensed with. In addition, a single-piece housing can be produced very cost-efficiently and provides a considerable weight saving.

What is claimed is:

1. A rack and pinion steering system for a motor vehicle comprising:
   a pinion shaft that is connected to a steering shaft and includes a steering pinion engaged with a rack mounted in a steering gear housing such that the rack is displaceable along a longitudinal axis for pivoting steerable wheels; and
   an electric motor that drives the pinion shaft via a step-down gear mechanism,
   wherein the steering shaft, the pinion shaft with the steering pinion, and the step-down gear mechanism are received in the steering gear housing, wherein the step-down gear mechanism is disposed at a first end of the pinion shaft that is remote from the steering shaft,
   wherein the step-down gear mechanism is a worm gear mechanism, wherein a worm gear of the worm gear mechanism surrounds the pinion shaft concentrically and is connected fixedly to the pinion shaft so as to rotate with the pinion shaft,
   wherein the pinion shaft is mounted rotatably in a bearing in the steering gear housing between the steering pinion and the worm gear,
   wherein the pinion shaft has a tapered portion between the steering pinion and the bearing, with a diameter of the tapered portion being smaller than that of the steering pinion and a bearing seat of the bearing.

2. The rack and pinion steering system of claim 1 wherein the step-down gear mechanism is disposed on the pinion shaft below the steering pinion.

3. The rack and pinion steering system of claim 1 wherein the electric motor is disposed on an underside of a steering gear.

4. The rack and pinion steering system of claim 1 wherein a second end of the pinion shaft that is proximate to the steering shaft is connected to a torsion bar that connects the pinion shaft to an input shaft, the torsion bar being part of a torque sensor that determines steering torque applied at a steering wheel and is required for actuating the electric motor, wherein the step-down gear mechanism and the electric motor are disposed on an opposite side of the rack with respect to the torque sensor.

5. The rack and pinion steering system of claim 1 wherein the pinion shaft is mounted rotatably in a bearing in the steering gear housing between the steering pinion and the first end of the pinion shaft.

6. The rack and pinion steering system of claim 1 wherein the electric motor is an electric servomotor that drives a worm shaft of the worm gear mechanism.

7. The rack and pinion steering system of claim 1 wherein the tapered portion adjoins the steering pinion directly on the pinion shaft.

* * * * *